US011838948B2

(12) United States Patent
Abeysekera et al.

(10) Patent No.: US 11,838,948 B2
(45) Date of Patent: Dec. 5, 2023

(54) ADJUSTING CCA THRESHOLD AND TRANSMISSION POWER TO REDUCE INTERFERENCE

(71) Applicant: NIPPON TELEGRAPH AND TELEPHONE CORPORATION, Tokyo (JP)

(72) Inventors: Hirantha Abeysekera, Musashino (JP); Toshiro Nakahira, Musashino (JP); Takafumi Hayashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 72 days.

(21) Appl. No.: 17/619,811

(22) PCT Filed: Jun. 21, 2019

(86) PCT No.: PCT/JP2019/024776
§ 371 (c)(1),
(2) Date: Dec. 16, 2021

(87) PCT Pub. No.: WO2020/255392
PCT Pub. Date: Dec. 24, 2020

(65) Prior Publication Data
US 2022/0338256 A1 Oct. 20, 2022

(51) Int. Cl.
*H04W 74/08* (2009.01)
*H04W 72/044* (2023.01)

(52) U.S. Cl.
CPC ... *H04W 74/0808* (2013.01); *H04W 72/0473* (2013.01); *H04W 74/0866* (2013.01)

(58) Field of Classification Search
None
See application file for complete search history.

(56) References Cited

U.S. PATENT DOCUMENTS 6,519,236 B1   2/2003 Haartsen et al.
9,699,741 B1 * 7/2017 Chu .................... H04W 74/002
(Continued)

FOREIGN PATENT DOCUMENTS

JP      2002525962 A      8/2002
JP      2006262212 A      9/2006
WO    WO-2018043600 A1   3/2018

OTHER PUBLICATIONS

Masahiro Morikura and Shuuji Kubota, "802.11 High Speed Wireless LAN Textbook" Revised 3rd Edition, Impress R & D, Mar. 27, 2008.

(Continued)

*Primary Examiner* — Benjamin Lamont
(74) *Attorney, Agent, or Firm* — Harness, Dickey & Pierce, P.L.C.

(57) ABSTRACT

In a wireless communication system wherein wireless terminal stations, each belonging to one of a plurality of wireless base stations, transmit on a shared frequency band, each of the wireless terminal stations includes means for notifying a control device of environmental information that indicates a communication status of the wireless terminal station itself via a wireless base station to which the wireless terminal station belongs, and for setting a transmission power value and a CCA threshold notified by the control device, and the control device includes means for calculating the transmission power value and the carrier sense threshold according to a predetermined control procedure based on the environmental information collected from the wireless terminal station via the wireless base station, and for notifying the wireless terminal station of the transmission power value and the carrier sense threshold via the wireless base station.

5 Claims, 4 Drawing Sheets

(56) References Cited

U.S. PATENT DOCUMENTS

| | | | |
|---|---|---|---|
| 10,236,998 B1* | 3/2019 | Monajemi | H04B 15/00 |
| 2015/0289142 A1* | 10/2015 | Abeysekera | H04W 72/0453 |
| | | | 370/338 |
| 2015/0319700 A1* | 11/2015 | Oteri | H04W 24/10 |
| | | | 455/127.1 |
| 2018/0176954 A1* | 6/2018 | Singh | H04W 74/0816 |
| 2019/0191385 A1 | 6/2019 | Shinohara et al. | |
| 2019/0191387 A1* | 6/2019 | Shakya | H04W 52/143 |
| 2020/0288324 A1* | 9/2020 | Ford | H04W 16/10 |
| 2021/0045012 A1* | 2/2021 | Lee | H04W 48/20 |
| 2021/0360694 A1* | 11/2021 | Pandian | H04W 28/0289 |
| 2021/0410185 A1* | 12/2021 | Do | H04W 16/14 |

OTHER PUBLICATIONS

Shoko Shinohara et al., Network-control Technique of CCA Threshold and Transmission Power with High Efficiency Wireless LAN, Lecture proceedings 1 of the 2016 communication society conference of IEICE, Sep. 20, 2016, p. 374.

* cited by examiner

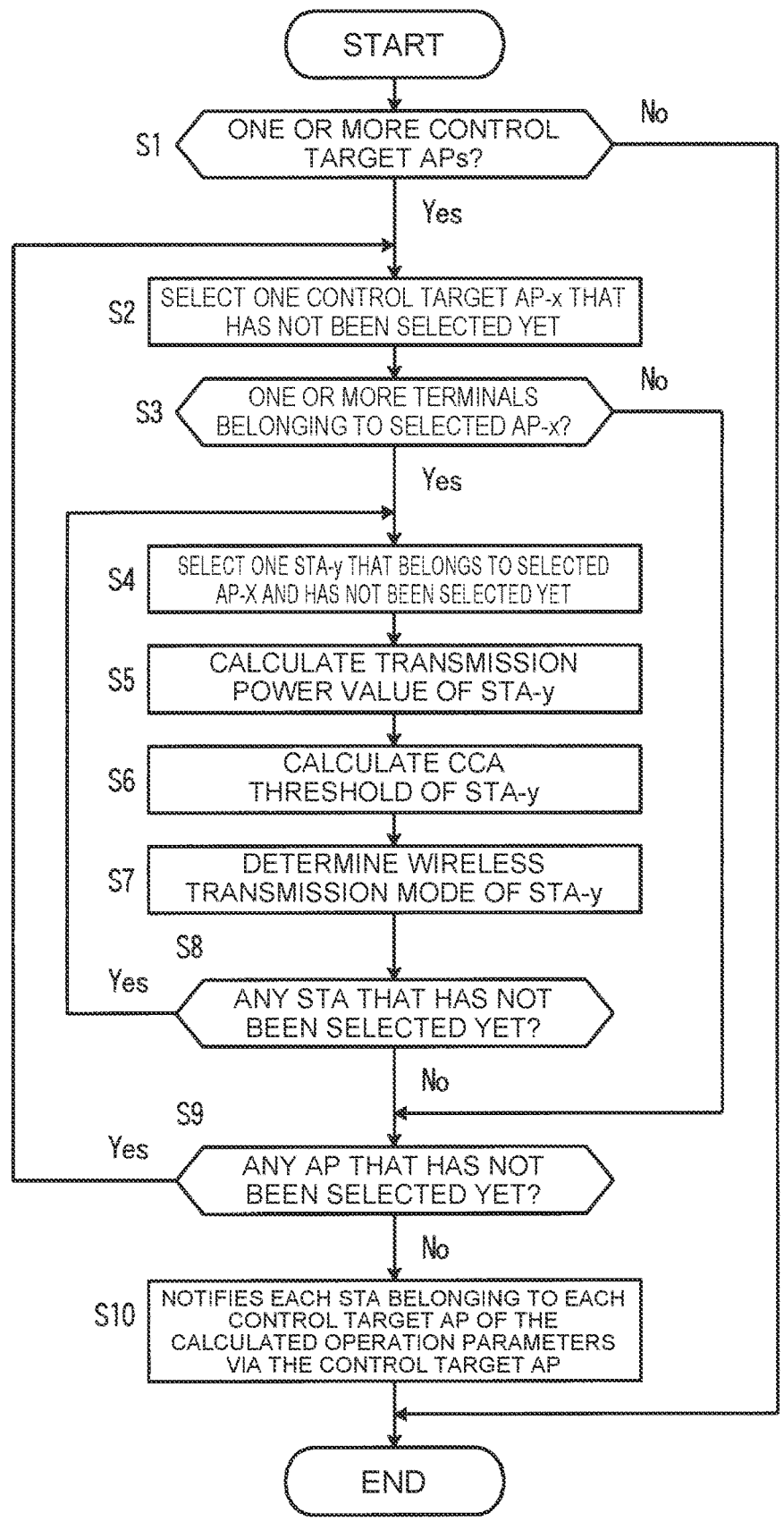

ADJUSTING CCA THRESHOLD AND TRANSMISSION POWER TO REDUCE INTERFERENCE

CROSS-REFERENCE TO RELATED APPLICATIONS

This application is a 371 U.S. National Phase of International Application No. PCT/JP2019/024776 filed on Jun. 21, 2019. The entire disclosures of the above applications are incorporated herein by reference.

TECHNICAL FIELD

The present invention relates to a wireless communication system and a wireless communication method for mitigating throughput degradation due to Carrier Sense Multiple Access with Collision Avoidance (CSMA/CA) control at each wireless station in a dense environment of a wireless Local Area Network (LAN).

BACKGROUND ART

In recent years, with the popularization of high-performance portable wireless terminals such as laptop computers and smartphones, wireless LANs compliant to the IEEE 802.11 standards have become widely used not only in business or public spaces but also at home. The IEEE 802.11 standards specifies a wireless LAN conforming to the IEEE 802.11b/g/n standard that uses the 2.4 GHz band and a wireless LAN conforming to the IEEE 802.11a/n/ac standard that uses the 5 GHz band.

For a wireless LAN conforming to the IEEE 802.11b standard or the IEEE 802.11g standard, 13 channels are provided at intervals of 5 MHz between 2400 MHz and 2483.5 MHz. When a plurality of channels are used at one place, a maximum of three channels or, in some cases, four channels can be used simultaneously so that the spectra of the channels do not overlap to prevent interference.

In Japan, for a wireless LAN conforming to the IEEE 802.11a standard, a total of 19 channels are specified, including non-overlapping 8 channels between 5170 MHz and 5330 MHz and non-overlapping 11 channels between 5490 MHz and 5710 MHz. In the IEEE 802.11a standard, the bandwidth of each channel is fixed to 20 MHz.

The maximum transmission rate of a wireless LAN conforming to the IEEE 802.11b standard is 11 Mbps and the maximum transmission rate of a wireless LAN conforming to the IEEE 802.11a standard or the IEEE 802.11g standard is 54 Mbps. It is noted that the aforementioned transmission rates refer to transmission rates in the physical layer. Because the transmission efficiency of the Medium Access Control (MAC) layer is about 50 to 70%, the actual maximum throughput is about 5 Mbps for the IEEE 802.11b standard and about 30 Mbps for the IEEE 802.11a standard and the IEEE 802.11g standard. With an increase in the number of wireless communication stations that attempt to transmit information, the transmission rates further decrease.

Meanwhile, for a wired LAN, high-speed lines of 100 Mbps to 1 Gbps, for example, via the Ethernet (R) 100Base-T interface, have become common with the prevalence of Fiber To The Home (FTTH) using optical fiber at home, and accordingly, a further improvement in the transmission rate of a wireless LAN is needed.

To this end, in the IEEE 802.11n standard finalized in 2009, the channel bandwidth, which had been fixed to 20 MHz, was expanded to 40 MHz and spatial multiplexing (Multiple Input Multiple Output) technology was introduced. By transmission and reception with all the functions specified in the IEEE 802.11n standard, a maximum communication rate of 600 Mbps can be achieved in the physical layer.

Moreover, in the IEEE 802.11ac standard finalized in 2013, the channel bandwidth was expanded to 80 MHz or a maximum of 160 MHz (or 80+80 MHz) and a Multi-User MIMO (MU-MIMO) transmission method using Space Division Multiple-Access (SDMA) was introduced. By transmission and reception with all the functions specified in the IEEE 802.11ac standard, a maximum communication rate of about 6.9 Gbps can be achieved in the physical layer.

In the IEEE 802.11ax standard currently under development, an Orthogonal Frequency Division Multiple Access (OFDM) is expected to be specified, which enables frame transmission and reception by dividing the aforementioned 20 MHz, 40 MHz, 80 MHz, 160 MHz, or 80+80 MHz channels into smaller subchannels. The OFDMA allows a plurality of wireless stations to transmit simultaneously in resource units by dividing the above channels into smaller subchannels. In addition, in the IEEE 802.11ax standard, a new function is expected to be specified, which increases transmission opportunities while reducing interference from nearby cells by controlling a carrier sense threshold (hereinafter referred to as a CCA threshold).

Because a wireless LAN conforming to the IEEE 802.11 standards operates on unlicensed frequency bands in the 2.4 GHz band or the 5 GHz band, a wireless base station in the IEEE 802.11 standards selects and operates on one frequency channel from frequency channels usable by the wireless base station when the wireless base station establishes a wireless LAN cell (Basic Service Set (BSS)).

The wireless base station operates the cell by notifying wireless terminals under the control of the wireless base station and nearby wireless communication stations of a channel used in the cell, a bandwidth, set values for other parameters, and other parameters usable by the wireless base station by including them in regularly transmitted Beacon frames or a Probe Response frame to a Probe Request frame received from a wireless terminal and transmitting the frames on the frequency channel determined for the operation of the wireless base station.

At a wireless base station, a frequency channel, a bandwidth and other parameters can be selected and set by the following four methods:
  (1) Use default parameter values set by the manufacturer of the wireless base station
  (2) Use values manually set by a user operating the wireless base station
  (3) Select and set the parameters autonomously based on wireless environmental information detected by each wireless base station at its start-up
  (4) Set the parameters to values determined by a centralized control station such as a wireless LAN controller The number of channels that can be used simultaneously at one place is three in a wireless LAN using the 2.4 GHz band and two, four, nine or nineteen in a wireless LAN using the 5 GHz band depending on the channel bandwidth used. Thus, a wireless base station needs to select channels to be used in its BSS when a wireless LAN is introduced (Non-Patent Literature 1).

In the 5 GHz band, the number of channels that can be used simultaneously at one place is nineteen when the channel bandwidth is 20 MHz and decreases to nine, to four and to two as the channel bandwidth expands from 20 MHz to 40 MHz, to 80 MHz and to 160 MHz or 80+80 MHz. That is, with an increase in the channel bandwidth, the number of usable channels decreases.

In a dense environment of a wireless LAN where the number of BSSs exceeds the number of usable channels, a plurality of BSSs use the same channel (Overlapping BSS (OBSS)). In such a wireless LAN, decentralized autonomous access control is provided, which allows data transmission on a channel when it is determined that the channel is unused by carrier sense using Carrier Sense Multiple Access with Collision Avoidance (CSMA/CA).

In particular, a wireless communication station where a transmission request occurs performs carrier sense first to monitor the state of the wireless medium for a predetermined sensing period (Distributed Inter-Frame Space (DIFS)) and performs random back-off if there is not any signal transmitted by other wireless communication stations in the sensing period. The wireless communication station continues to perform carrier sense in the random back-off period and is given a right to use the channel if there is not any signal transmitted by other wireless communication stations in the random back-off period. Whether transmission or reception is being performed or not by other wireless communication stations is determined depending on whether a signal larger than a preset carrier sense threshold is received or not. The wireless communication station having the right to use the channel can transmit data to other wireless communication stations in the same BSS and can receive data from those wireless communication stations. If such CSMA/CA control is used in a dense environment of a wireless LAN where the same channel can be used by a plurality of BSSs, it is frequently determined by carrier sense that the channel is busy and therefore the throughput degrades. Thus, it is important to monitor a surrounding environment, select a suitable channel, and select a transmission power value and a carrier sense threshold that enable simultaneous transmission and reception.

CITATION LIST

Non-Patent Literature

Non-Patent Literature 1: Morikura, Masahiro and Shuji Kubota, supervising editors. 802.11 *High-Speed Wireless Lan Textbook*. Rev. 3rd ed., Impress R&D, March 2008.

SUMMARY OF THE INVENTION

Technical Problem

Because the IEEE 802.11 standards do not specify a method for selecting the above-mentioned parameters, for example, for selecting the operating frequency band of a wireless base station from the 2.4 GHz band or the 5 GHz band and for selecting channels to be used in the operating frequency band, each vendor implements its own method.

Furthermore, because each wireless station selects the above parameters in a decentralized autonomous manner, the whole system cannot be optimized, and particularly in an environment that includes a large number of wireless stations, the quality experienced by users degrades significantly.

For example, when there are a plurality of wireless stations that can operate on either the 2.4 GHz band or the 5 GHz band, if the 2.4 GHz band and the 5 GHz band are not adequately allocated, the plurality of wireless stations have to share a small number of channels. Such inadequate frequency band allocation may also lead to inefficient operation. For example, the service area of one of those frequency bands cannot be ensured, or the service areas of both frequency bands may overlap unnecessarily.

When neighboring wireless communication systems use the same frequency channel as just described, interference occurs. In CSMA/CA control, before transmission of a wireless signal, the presence of another wireless signal is determined by carrier sense and if there is not any other wireless signal, the transmission is carried out. In common CSMA/CA control, each wireless terminal station sets transmission control parameters (including a transmission power value and a CCA threshold) autonomously, and the system throughput degrades depending on the number of neighboring wireless communication systems.

An object of the present invention is to provide a wireless communication system and a wireless communication method that can realize a high-quality wireless environment for every user, aiming at an increased throughput of the whole wireless communication system, by adequately setting the transmission power value and the CCA threshold of each wireless terminal station.

Means for Solving the Problem

A first aspect of the present invention provides a wireless communication system wherein wireless terminal stations, each belonging to one of a plurality of wireless base stations, transmit on a shared frequency band, each of the wireless terminal stations including means for notifying a control device of environmental information that indicates a communication status of the wireless terminal station itself via a wireless base station to which the wireless terminal station belongs, and for setting a transmission power value and a CCA threshold notified by the control device, the control device including means for calculating the transmission power value and the carrier sense threshold according to a predetermined control procedure based on the environmental information collected from the wireless terminal station via the wireless base station, and for notifying the wireless terminal station of the transmission power value and the carrier sense threshold via the wireless base station.

A second aspect of the present invention provides a wireless communication method wherein wireless terminal stations, each belonging to one of a plurality of wireless base stations, transmit on a shared frequency band, the method comprising: by each of the wireless terminal stations, notifying a control device of environmental information that indicates a communication status of the wireless terminal station itself via a wireless base station to which the wireless terminal station belongs, and setting a transmission power value and a CCA threshold notified by the control device; and by the control device, calculating the transmission power value and the carrier sense threshold according to a predetermined control procedure based on the environmental information collected from the wireless terminal station via the wireless base station, and notifying the wireless terminal station of the transmission power value and the carrier sense threshold via the wireless base station.

Effects of the Invention

The present invention can realize a high-quality wireless environment for every user by adequately setting the transmission power values and the CCA thresholds of wireless terminal stations to change the coverage area of a wireless communication system so that the throughput of the whole system can be increased.

BRIEF DESCRIPTION OF DRAWINGS

FIG. 5 is a diagram illustrating an operation flow of the control device 30 according to the present invention.

DESCRIPTION OF EMBODIMENTS

Figure 1:
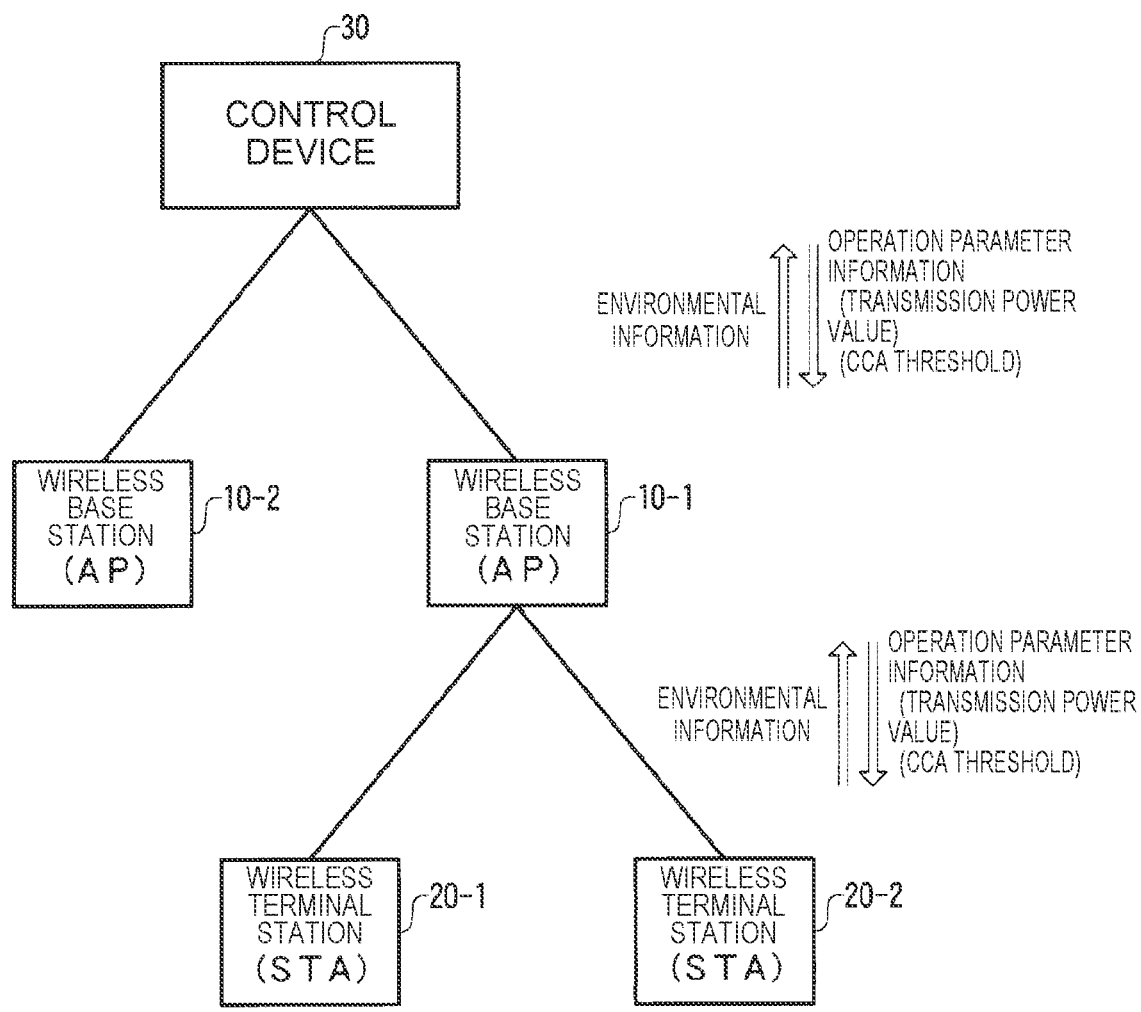
FIG. 1 is a diagram illustrating an exemplary configuration of a wireless communication system according to the present invention.

FIG. 1 illustrates an exemplary configuration of a wireless communication system according to the present invention. As an example of controlling wireless stations that operate on a shared frequency band, the present specification describes how the transmission power values and the CCA thresholds of wireless terminal stations (STAs) belonging to wireless base stations (APs) are controlled.

In FIG. 1, the wireless communication system has a configuration in which a plurality of wireless base stations (APs) 10-1 and 10-2 are connected to a control device 30. Wireless terminal stations (STAs) 20-1 and 20-2 belong to and are connected to the AP 10-1. Wireless terminal stations belonging to the AP 10-2 are not shown. Each of the STAs 20-1 and 20-2 notifies the control device 30 of environmental information via the AP 10-1 and operates on operation parameter information notified by the control device 30.

The environmental information includes a RSSI value at the AP, an amount of data (uplink/downlink) transmitted/received by the STA, an MCS for the STA, and a state of interference from the surroundings. The operation parameter information includes a transmission power value and a CCA threshold for the STA.

Figure 2:
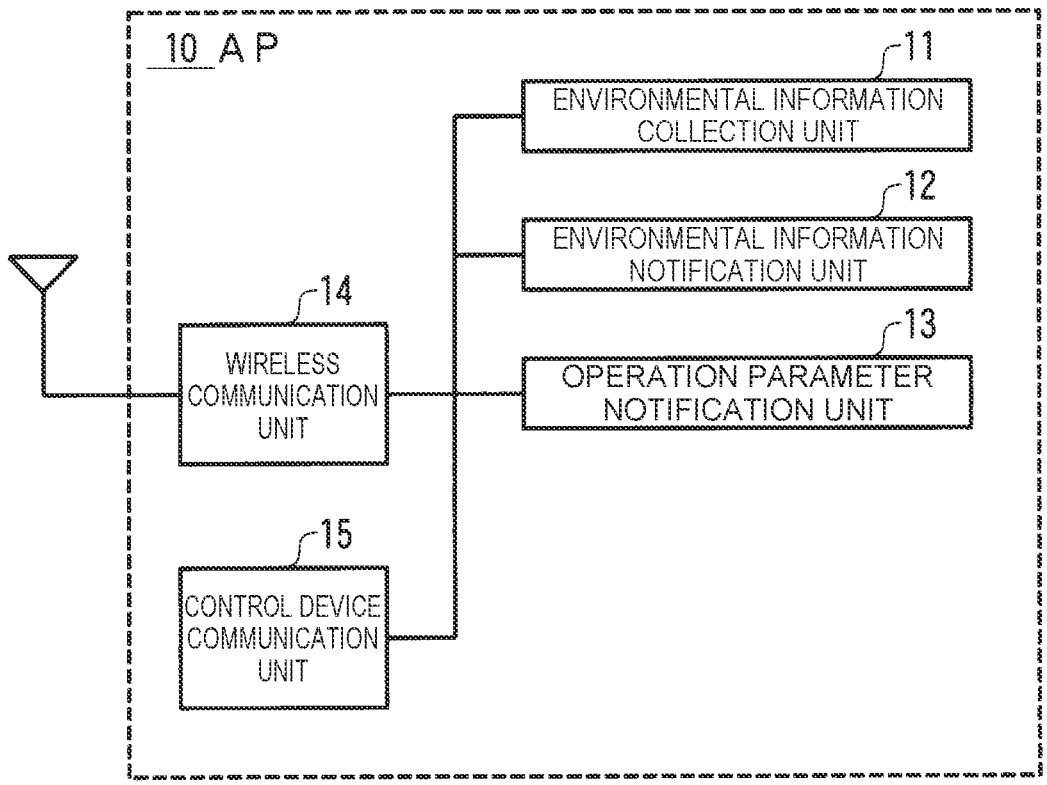
FIG. 2 is a diagram illustrating an exemplary configuration of a wireless base station (AP) 10.

FIG. 2 illustrates an exemplary configuration of a wireless base station (AP) 10. In FIG. 2, the AP 10 includes an environmental information collection unit 11 that collects environmental information from STAs belonging to the AP 10, an environmental information notification unit 12 that notifies the control device 30 of the environmental information, an operation parameter notification unit 13 that notifies the STAs of operation parameter information (transmission power values and CCA thresholds for the STAs) notified by the control device 30, a wireless communication unit 14 that communicates with the STAs belonging to the AP 10, and a control device communication unit 15 that communicates with the control device 30 in a wired or wireless manner.

Figure 3:
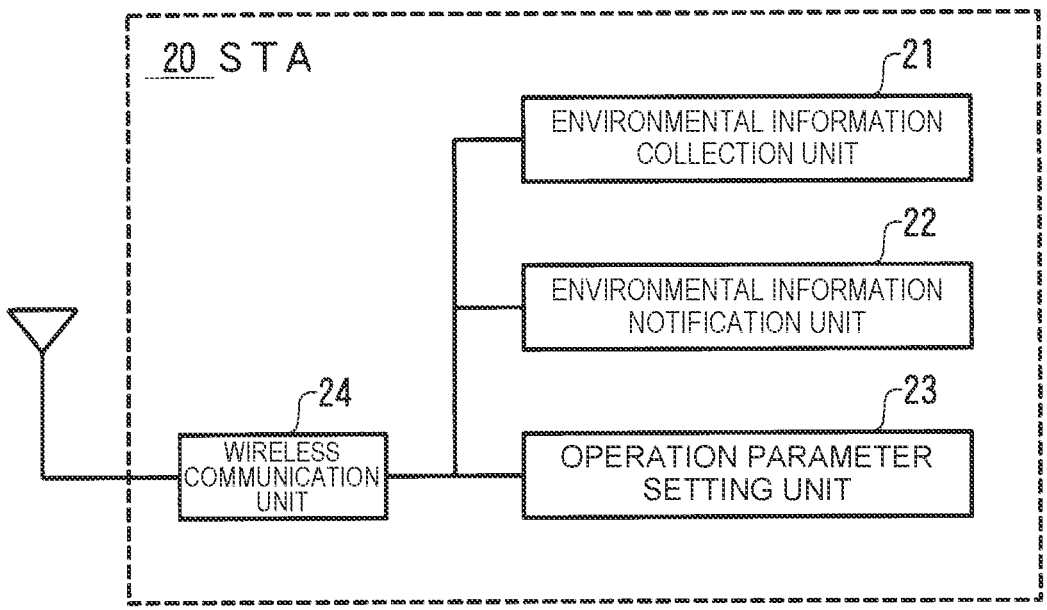
FIG. 3 is a diagram illustrating an exemplary configuration of a wireless terminal station (STA) 20.

FIG. 3 illustrates an exemplary configuration of a wireless terminal station (STA) 20. In FIG. 3, the STA 20 includes an environmental information collection unit 21 that collects environmental information of the STA 20 itself, an environmental information notification unit 22 that notifies an AP 10 of the environmental information, an operation parameter setting unit 23 that sets operation parameter information (a transmission power value and a CCA threshold) notified by the AP 10, and a wireless communication unit 24 that communicates with the AP 10.

Figure 4:
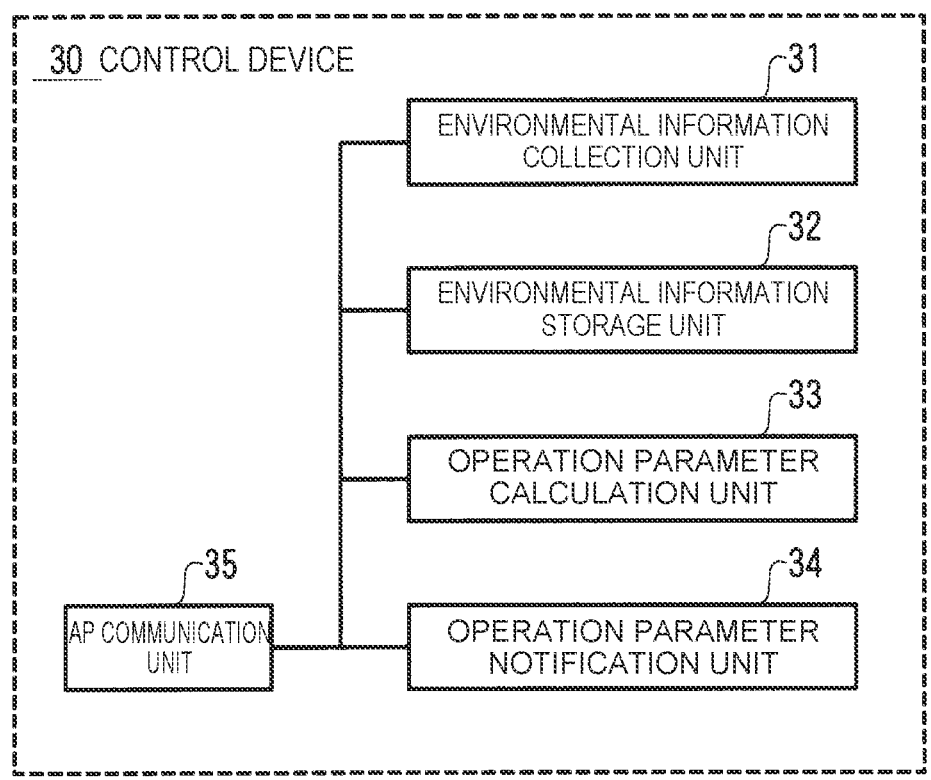
FIG. 4 is a diagram illustrating an exemplary configuration of a control device 30.

FIG. 4 illustrates an exemplary configuration of the control device 30. In FIG. 4, the control device 30 includes an environmental information collection unit 31 that collects environmental information from STAs notified by each AP 10, an environmental information storage unit 32 that stores the collected environmental information, an operation parameter calculation unit 33 that calculates operation parameters (a transmission power value and a CCA threshold) for each STA based on the collected and stored environmental information, an operation parameter notification unit 34 that provides a notification of the calculated operation parameters, and an AP communication unit 35 that communicates with each AP 10 in a wired or wireless manner.

FIG. 5 illustrates an operation flow of a control device 30 according to the present invention. This operation flow shows a procedure of calculating a transmission power value and a CCA threshold for each STA, which is performed by the operation parameter calculation unit 33 of the control device 30.

In FIG. 5, STAs belonging to control target APs are controlled according to the invention. The operation parameter calculation unit 33 determines whether there are one or more control target APs (S1) and if there is not any control target AP, the process terminates. If there are one or more control target APs, the operation parameter calculation unit 33 selects one control target AP-x that has not been selected yet (S2), and determines whether there are one or more STAs belonging to the selected control target AP-x (S3). If there is not any STA belonging to the AP-x, the operation parameter calculation unit 33 selects another control target AP-x that has not been selected yet (S9, S2).

The operation parameter calculation unit 33 then selects an STA-y that has not been selected yet from the STAs belonging to the control target AP-x (S4), calculates a transmission power value (S5), calculates a CCA threshold (S6), and determines a wireless communication mode (S7) as operation parameters for the selected STA-y. The operation parameter calculation unit 33 repeats steps S5 to S7 until there is not any STA that has not been selected yet and there is not any AP that has not been selected yet (S8, S9). Finally, the operation parameter notification unit 34 notifies each STA belonging to each control target AP of the calculated operation parameters via the control target AP (S10).

In step S5, the operation parameter calculation unit 33 detects uplink RSSI values, which indicate the strengths of signals from the STA-y, at the control target AP-x, calculates a difference between the average of the uplink RSSI values and a threshold, and sets the difference as a correction value "a" for the transmission power value of the STA-y. The threshold may be set depending on a distance between neighboring APs, a traffic application and an amount of traffic, a bandwidth used, and the state of the STA (mobile/fixed). For example, if the distance between neighboring APs is short, the operation parameter calculation unit 33 decreases the threshold (if the threshold has a negative value, increases the absolute value of the threshold). If the distance between neighboring APs is long, the transmission power can be raised and therefore the operation parameter calculation unit 33 increases the threshold. In addition, the operation parameter calculation unit 33 increases the threshold to expand the coverage area if the traffic application is a voice communication application, and decreases the threshold to reduce the coverage area if the amount of traffic is large.

In this way, the operation parameter calculation unit 33 controls the transmission power value of each STA depending on a difference between the average of RSSI values and the threshold. This enables STAs to use the same frequency channel while reducing interference to neighboring systems. In this regard, the following CCA threshold adjustment is required. In order to achieve simultaneous transmission, the STAs have to transmit even when they detect interference from the neighboring systems. Thus, the operation parameter calculation unit 33 increases or decreases the CCA threshold of each STA depending on the increased or decreased transmission power value. For example, if the transmission power value is decreased by 3 dB, the CCA threshold is increased by 3 dB. This makes it possible for a plurality of systems to communicate with each other simultaneously using the same frequency channel at the time when the transmission power values of STAs are suitable.

In step S6, the operation parameter calculation unit 33 increases the CCA threshold by a correction value "a–b" if the transmission power value of the STA-y is decreased by the correction value "a" and decreases the CCA threshold by the correction value "a-b" if the transmission power value of the STA-y is increased by the correction value "a." "b" is an adjustment value for the CCA threshold. When "b" is 0, the CCA threshold is increased or decreased by the same amount as the correction value "a" for the transmission power value.

An example is provided using the AP 10-1 and the STAs 20-1 and 20-2 in FIG. 1. The parameters are as follows:
The threshold for RSSI values: −50 dBm
The adjustment value "b" for the CCA threshold: −1 dBm
The transmission power value of the STA 20-1: −30 dBm
The average RSSI value of the STA 20-1 at the AP 10-1: −35 dBm
The transmission power value of the STA 20-2: −32 dBm
The average RSSI value of the STA 20-2 at the AP 10-1: −40 dBm
The correction value "a" for the transmission power value of the STA 20-1 is a decrease of (−35)−(−50)=15 dB. The correction value "a–b" for the CCA threshold of the STA 20-1 is an increase of 15−(−1)=16 dB. The correction value "a" for the transmission power value of the STA 20-2 is a decrease of (−40)−(−50)=10 dB. The correction value "a–b" for the CCA threshold of the STA 20-1 is an increase of 10−(−1)=11 dB.

In step S7, the operation parameter calculation unit 33 determines, for the wireless communication mode, whether Orthogonal Frequency Division Multiple Access (OFDMA) is enabled or disabled and whether MultiUser-Multiple Input Multiple Output (MU-MIMO) is enabled or disabled.

OFDMA is effective for a wireless environment A where short packet communication is implemented, there are relatively large amounts of uplink traffic, a large number of control signals are exchanged, or the strengths of signals from a plurality of STAs are substantially the same.

MU-MIMO is effective for a wireless environment B where STAs less frequently move, a plurality of STAs have similar traffic patterns, or the wireless environment less frequently changes.

Accordingly, the operation parameter calculation unit 33 enables both OFDMA and MU-MIMO when it is determined that "the wireless environment A and the wireless environment B" hold for a wireless environment based on the signal strength between the AP and the STA, the stability of the signal strength whether or not it exceeds a threshold, time consumed in one signal transmission, the number of STAs belonging to the AP, and the number and the communication frequency of other nearby wireless stations with which a frequency channel is shared. When it is determined that the wireless environment A holds but the wireless environment B does not hold, OFDMA is enabled and MU-MIMO is disabled. When it is determined that neither the wireless environment A nor the wireless environment B holds, OFDMA is disabled and MU-MIMO is disabled.

REFERENCE SIGNS LIST

10 Wireless base stations (APs)
11 Environmental information collection unit
12 Environmental information notification unit
13 Operation parameter setting unit
14 Wireless communication unit
15 Control device communication unit
20 Wireless terminal stations (STAs)
21 Environmental information collection unit
22 Environmental information notification unit
23 Operation parameter notification unit
24 Wireless communication unit
30 Control device
31 Environmental information collection unit
32 Environmental information storage unit
33 Operation parameter calculation unit
34 Operation parameter notification unit
35 AP communication unit

The invention claimed is:

1. A wireless communication system wherein wireless terminal stations, each belonging to one of a plurality of wireless base stations, transmit on a shared frequency band, comprising: each of the wireless terminal stations including means for notifying a control device of environmental information that indicates a communication status of the wireless terminal station itself via a wireless base station to which the wireless terminal station belongs, and for setting a transmission power value and a carrier sense threshold notified by the control device, the control device including means for calculating the transmission power value and the carrier sense threshold according to a predetermined control procedure based on the environmental information collected from the wireless terminal station via the wireless base station, and for notifying the wireless terminal station of the transmission power value and the carrier sense threshold via the wireless base station; wherein the control procedure includes calculating a difference between a predetermined threshold and an average of strengths of signals from the wireless terminal station at the wireless base station to which the wireless terminal station belongs, and setting the difference as a correction value for the transmission power value of the wireless terminal station wherein the predetermined threshold is set depending on a distance between neighboring wireless base stations, a traffic application and an amount of traffic, a bandwidth used, and whether the wireless terminal station is mobile or fixed.

2. The wireless communication system according to claim 1, wherein
the control procedure further includes determining a correction value for the carrier sense threshold depending on the correction value for the transmission power value of the wireless terminal station.

3. A wireless communication method wherein wireless terminal stations, each belonging to one of a plurality of wireless base stations, transmit on a shared frequency band, the method comprising: by each of the wireless terminal stations, notifying a control device of environmental information that indicates a communication status of the wireless terminal station itself via a wireless base station to which the wireless terminal station belongs, and setting a transmission power value and a carrier sense threshold notified by the control device; and by the control device, calculating the transmission power value and the carrier sense threshold according to a predetermined control procedure based on the environmental information collected from the wireless terminal station via the wireless base station, and notifying the wireless terminal station of the transmission power value and the carrier sense threshold via the wireless base station; wherein the control procedure includes calculating a difference between a predetermined threshold and an average of strengths of signals from the wireless terminal station at the wireless base station to which the wireless terminal station belongs, and setting the difference as a correction value for the transmission power value of the wireless terminal station; wherein the predetermined threshold is set depending on a distance between neighboring wireless base stations, a traffic application and an amount of traffic, a bandwidth used, and whether the wireless terminal station is mobile or fixed.

4. The wireless communication method according to claim 3, wherein the control procedure further includes determining a correction value for the carrier sense threshold depending on the correction value for the transmission power value of the wireless terminal station.

5. A wireless communication system wherein wireless terminal stations, each belonging to one of a plurality of wireless base stations, transmit on a shared frequency band, comprising: each of the wireless terminal stations including means for notifying a control device of environmental information that indicates a communication status of the wireless terminal station itself via a wireless base station to which the wireless terminal station belongs, and for setting a transmission power value and a carrier sense threshold notified by the control device, the control device including means for calculating the transmission power value and the carrier sense threshold according to a predetermined control procedure based on the environmental information collected from the wireless terminal station via the wireless base station, and for notifying the wireless terminal station of the transmission power value and the carrier sense threshold via the wireless base station; wherein the control procedure includes calculating a difference between a predetermined threshold and an average of strengths of signals from the wireless terminal station at the wireless base station to which the wireless terminal station belongs, and setting the difference as a correction value for the transmission power value of the wireless terminal station; wherein the predetermined threshold is set depending on a distance between neighboring wireless base stations, a traffic application, and an amount of traffic.

* * * * *